No. 786,551. PATENTED APR. 4, 1905.
W. W. DOOLITTLE.
METHOD OF ATTACHING FLANGES TO TUBES.
APPLICATION FILED SEPT. 3, 1901.
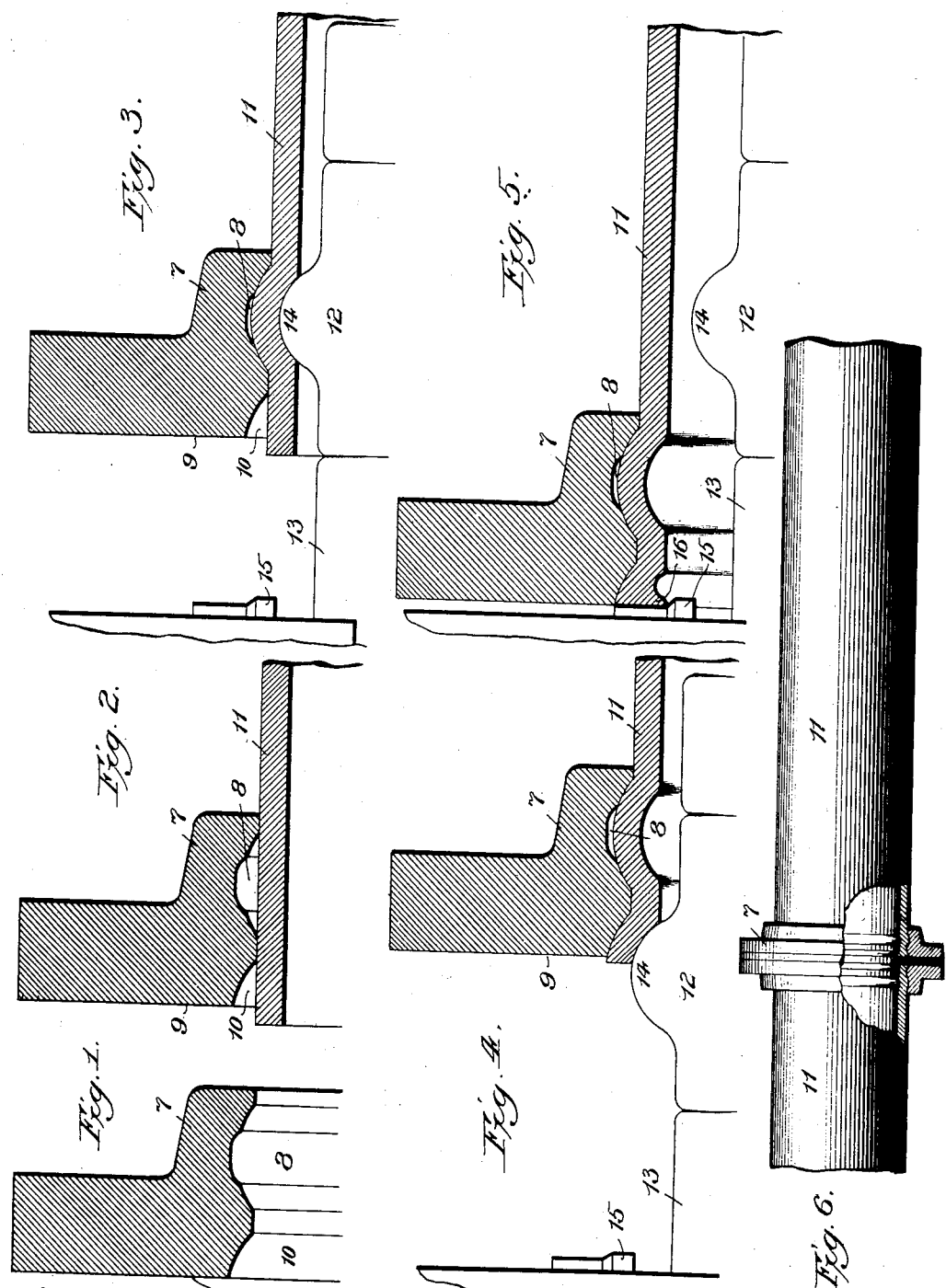

No. 786,551.

Patented April 4, 1905.

UNITED STATES PATENT OFFICE.

WILLIAM W. DOOLITTLE, OF CHICAGO, ILLINOIS, ASSIGNOR TO CRANE COMPANY, OF CHICAGO, ILLINOIS, A CORPORATION OF ILLINOIS.

METHOD OF ATTACHING FLANGES TO TUBES.

SPECIFICATION forming part of Letters Patent No. 786,551, dated April 4, 1905.

Application filed September 3, 1901. Serial No. 74,199.

*To all whom it may concern:*

Be it known that I, WILLIAM W. DOOLITTLE, a citizen of the United States of America, residing at Chicago, Cook county, Illinois, have invented certain new and useful Improvements in Methods of Attaching Flanges to Tubes, of which the following, taken in connection with the accompanying drawings, is a specification.

This invention has reference to an improved method of securing flanges to tubes or pipes, to eliminate the necessity for using screw-thread attachment therebetween, and to reduce the expense and facilitate the operation of securing the flanges to the tube.

Another object of the present invention is to make a connection between a tube and flange, which will be more secure against leakage than those heretofore proposed, and will stand a greater pressure.

In order to better understand my invention I will now proceed to describe the same in connection with the accompanying drawings in which in Figure 1 I have shown in section a portion of a flange adapted to be used on a pipe or tube, in Figure 2 I have shown the flange with the tube in position, in Figure 3 I have shown the tube and flange with the apparatus employed by me in securing the two together, in Figure 4 I have shown the parts in another position, illustrating another portion of the operation, and in Figure 5 I have shown a section on an enlarged scale (the same as the scale employed in the other figures referred to,) the completed flange and tube attached together, and in Figure 6 I have shown in elevation, the end of a pipe or tube with the flange attached thereto.

The several figures above referred to illustrate clearly the several steps of my process or method. In Figure 1 it will be seen that in the flange 7 I have cut, within the cylindrical opening thereof, an annular groove 8, and in the end of the cylindrical opening thereof, adjacent to the face 9, another annular groove or half groove, possibly better termed a recess 10. In Figure 2 the flange 7 is shown in position over the end of a tube 11 ready to be attached to the same. In Figure 3 I have shown a roller 12 mounted on a spindle 13 driven by any suitable power, and having a raised place or bead 14 which is rolled upward upon the inside of the tube 11 so as to expand or press the same outwardly into the groove or recess 8 which being done by very heavy pressure causes an intimate contact between the outer surface of the tube and the inner face of the sides of the recess 8.

In Figure 4 I have shown the parts moved to a position in which the roller 12 will operate by the raised portion 14 upon the end of the tube 11 to expand the same into the half recess 10 in the manner shown, and in Figure 5 I have shown another roller 15 brought up against the end of the tube so as to upset the same, and press it inward against the flange 7, until the surface of the end is flush with the surface of the flange as shown in said Figure 5, and until the end has been widened by the upsetting action as shown at 16. This action is rendered possible by the secure attachment between the flange and the tube procured through the engagement of the bead or enlargement which enters the recess 8 in the flange. In Figure 6 the tube 11 and the flange 7 are shown after the completion of the operation, in side elevation.

The face of the end of the tube 11 being thus rolled to a surface approximately flush with the face of the flange 7, both may be conveniently finished by facing off the ends after which the gasket used can be placed as shown at 17 in position to cover both the face of the flange and the end of the tube, thus making the joint between the tube and flange more secure against leakage, this result being further promoted by the fact that the upsetting of the end of the tube has widened the bearing where the gasket covers it.

Having thus described my invention, what I claim as new, and desire to secure by Letters Patent, is—

1. The herein described method of securing flanges to tubes, which consists in providing the flange with a recess within the opening thereof, and a half recess adjacent to the face thereof, rolling the tube into the recess, then rolling the end of the tube outward radially into the half recess, (and finally upsetting the end of the tube to bring it into the plane of the face of the flange, and make the joint secure against leakage,) substantially as described.

2. The herein described method of securing flanges to tubes, which consists in providing the flange with a recess within the opening thereof, and a half recess adjacent to the face thereof, rolling the tube into the recess, and afterward rolling the end of the tube outward radially into the half recess, substantially as described.

3. The herein described method of securing flanges to tubes, which consists in providing the flange with a recess within the opening thereof, rolling the tube outwardly into said recess and afterward upsetting the end of the tube by rolling the same with pressure exerted longitudinally, substantially as described.

4. The method of attaching tubes to flanges which consists in providing two annular recesses in the flange, expanding the tube into one of said recesses, then independently expanding the tube into the other recess (thereby inducing a bending strain upon the expanded metal in the first recess,) and then compressing the metal into the latter recess by pressure exerted perpendicularly to the plane of the annular recess, substantially as described.

WILLIAM W. DOOLITTLE.

In presence of—
  PAUL CARPENTER,
  F. O. GREEN.